United States Patent
Odagiri et al.

(10) Patent No.: US 6,204,807 B1
(45) Date of Patent: Mar. 20, 2001

(54) PORTABLE GPS POSITIONING APPARATUS

(75) Inventors: Hiroshi Odagiri; Kazumi Sakumoto; Keisuke Tsubata, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/141,785

(22) Filed: Aug. 28, 1998

(30) Foreign Application Priority Data

Aug. 29, 1997 (JP) ...................................................... 9-233737

(51) Int. Cl.[7] ....................................................... G01S 5/02
(52) U.S. Cl. ..................................... 342/357.06; 701/213
(58) Field of Search ................................... 342/357, 352; 701/213, 214

(56) References Cited

U.S. PATENT DOCUMENTS 5,583,776 * 12/1996 Levi et al. ........................... 364/450
5,708,626 * 1/1998 Hrubes ................................ 367/131
5,787,384 * 7/1998 Johnson .............................. 701/216
5,828,987 * 10/1998 Tano et al. .......................... 702/150

* cited by examiner

Primary Examiner—Thomas H. Tarcza
Assistant Examiner—Dao L. Phan
(74) Attorney, Agent, or Firm—Adams & Wilks

(57) ABSTRACT

A portable GPS receiver receives a signal from a GPS satellite by a GPS receiving means to measure a position and a speed of the own receiver. A traveling pitch detector detects a traveling pitch of a human body. A timer determines an operating period to intermittently operate reception from the GPS satellite. A stride calculator calculates, on the operating period, a traveling stride from received positioning data between two points and a pitch detected by the traveling pitch detector during obtaining the positioning data. A speed/distance calculator calculates, on the operating period, a traveling speed and a traveling distance from the stride determined by the stride calculator and the pitch detected by the traveling pitch detector.

9 Claims, 16 Drawing Sheets

PORTABLE GPS POSITIONING APPARATUS

BACKGROUND OF THE INVENTION

This invention relates to a portable GPS receiver adapted to receive signals from GPS (Global Positioning System) satellites and measure locations and speeds of the receiver. More particularly, the invention relates to a GPS receiver which can be held by or worn on a human arm in order to measure locations, moving speeds and moving distances during running, walking, or other movement of the human body.

Conventionally, the GPS system has 24 GPS satellites revolving at a rate of 12 hours per turn on six orbits at an inclination angle of 55 degrees above approximately 20,200 Km around the earth. The navigation data required for positioning is transmitted from three to four or more satellites, and received by a receiver installed on the earth so that a mobile body having the receiver mounted therein may have calculated its position such as location, moving speed, etc.

Although the transmission wave by the GPS involves two kinds, i.e., L1 with a frequency of 1.57542 GHz and L2 with a frequency of 1.22760 GHz, ordinary positioning utilizes only L1. L1 is subjected to PSK modulation by a pseudo noise code (a synthetic wave of a C/A code for satellite identification and navigation data such as satellite orbit information, time information, etc.) and spread spectrum, to be transmitted.

FIG. 15 shows a block diagram of a GPS receiver for receiving radio waves as stated above. In the figure, 1501 is an antenna for receiving radio waves transmitted from the GPS satellites, 1502 is a L-band amplifying circuit for amplifying a received L-band signal, 1503 is a down-converter for performing signal conversion as described below, 1504 is a voltage comparator for digitally converting a signal supplied from the down converter 1503, 1505 is a message decoding circuit for obtaining carrier-wave phase information corresponding in pseudo distance to the navigation data, and 1506 is a C/A code generating circuit for generating C/A codes, 1507 is a position calculating section for calculating position data. These constituent elements are systematically connected therebetween, constituting the GPS receiver.

The GPS receiver structured as described above performs signal reception, as explained hereinbelow. The 1.57542 GHz signal received by the antenna 1501 is amplified by the L-band amplifying circuit 1502. This amplified signal is converted by the down-converter 1503 into an first IF (intermediate frequency) signal of several tens of MHz–200 MHz, and then into a second IF signal of approximately 2 MHz–5 MHz. This second IF signal is inputted to the voltage comparator 1504 and digital-converted with a clock several times the IF signal. Spread spectrum data is obtained as an output from the voltage comparator.

In the massage decoding circuit 1505, the digital signal outputted by the voltage comparator 1504 is subjected to reverse spread spectrum with a C/A code, i.e., the same pseudo noise code as that of the satellite, which is generated by the C/A code generating circuit 1506. Thus, carrier-wave phase information is obtained that is corresponding in pseudo distance to the navigation data. This operation is performed on a plurality of satellites. The position calculating section 1507 determines position data from the navigation data, usually, of four satellites. The position data determined by the position calculating section 1507 is supplied to the CPU for controlling operations of the entire portable apparatus, or otherwise to the outside as a digital signal.

Recently, GPS receivers as described above have been utilized for a vehicular navigation apparatus. Meanwhile, GPS receivers are also made very small and utilized as a portable apparatus for the purpose of determining a direction of a human body or a moving distance during walking, as disclosed by "Signal Receiver" in Japanese Laying-open Patent Publication No. H6-18156.

Where the conventional GPS receiver as described above is utilized to measure a moving speed or distance of a human body, if the GPS receiver is for example of a vehicular mounting type, the use of a self-navigating means such as map-matching enables a navigating operation to continue even where positioning is difficult to effect such as in tunnels or building valleys. However, where such a GPS receiver is utilized as a compact receiver for example in a portable form, it becomes difficult to incorporate CD-ROM map information therein due to smallness in size.

Also, where considering a vehicle, the moving distance or speed can be obtained from instruments installed on the vehicle. However, where the receive is of an on-arm type, the moving distance is determined from the GPS satellite. Consequently, if the satellite information becomes impossible to receive, there is a fear that the distance measurement is also impossible to carry out. Further, a human body will frequently vary in direction of movement. To accurately determine a moving distance requires continuously performing the operation of positioning. This, however, results in a problem in that the GPS receiver has an increased power consumption.

SUMMARY OF THE INVENTION

It is an object of the present invention to provide a portable GPS receiver which can measure a moving distance even where the GPS satellite information cannot be received, and which avoids continuous GPS reception to save power consumption.

A portable GPS receiver, according to one aspect of the invention, is adapted to receive a signal from a GPS satellite by a GPS receiving means to measure a position and a speed of the receiver, the portable GPS receiver comprising: a traveling pitch detecting means for detecting a traveling pitch of a human body; a timer means for determining an operating period to intermittently enable reception from the GPS satellite; a stride calculating means for calculating, based on the operating period, a traveling stride from received positioning data between two points and a pitch detected by the traveling pitch detecting means during obtaining the positioning data; and a speed/distance calculating means for calculating, based on the operating period, a traveling speed and a traveling distance from the stride determined by the stride calculating means and the pitch detected by the traveling pitch detecting means.

That is, a traveling stride, is determined from a moving distance between two points at which the GPS receiver effects positioning and a number of traveling pitches determined during the positioning. A moving distance and a moving speed are determined from the stride. This makes it possible to achieve continuous measurement even where positioning is difficult to effect such as in a tunnel or a valley between buildings. Also, the moving distance and the moving speed are determined with the stride as a reference, eliminating the necessity of continuously effecting positioning of the GPS receiving means.

In a portable GPS receiver according to another aspect of the invention, the GPS receiving means continuously effects positioning for a time period of from starting measurement of the traveling speed and the traveling distance to determining the traveling stride by the stride calculating means.

That is, the time period of continuous positioning of the GPS receiving means is minimized by performing continuous positioning only during the period from starting the measurement of a traveling speed and a traveling distance to determining a traveling stride.

In a portable GPS receiver according to a third aspect of the invention, evaluation is made after effecting GPS positioning whether a difference in advancing direction between a preceding time and a current time is within a given amount, and the positioning of the GPS receiver is continuously effected during a time period of moving a predetermined distance when there is a change in moving direction.

That is, after the GPS positioning, it is evaluated whether the difference in advancing direction between the preceding time and the present time is within a given amount or not. As a result, if there is a change in moving direction, the positioning of the GPS receiver is continuously made during a movement over a given distance. This can eliminate a large error occurring between a straight-lined moving distance obtained by coordinates by the GPS receiver and an actual distance, where a large difference exists in moving direction between two positioning points.

In a portable GPS receiver according to a fourth aspect of the invention, a moving direction detecting means is further provided for detecting a moving direction of the human body, wherein the positioning of the GPS receiver is controlled based on an output signal of the moving direction detecting means.

That is, a means for detecting a moving direction of a human body is provided. The positioning of the GPS receiver is controlled based on a detected signal of that means. This enables recognition of two coordinates varying in moving direction without relying on a timer.

In a portable GPS receiver according to a fifth aspect of the invention, a correction signal for each GPS satellite transmitted from a receiving reference station is employed, DGPS receiving means are provided to correct a received signal from each GPS satellite, wherein the receiving reference base station is selected from GPS positioning data and switching is made to DGPS positioning of the DGPS receiving means.

That is, the GPS signal reception is effected at a start of measurement. A receiving base station for the DGPS data link receiver is selected from positioning data obtained. Thereafter, DGPS operation is carried out with accuracy.

In a portable GPS receiver according to a sixth aspect of the invention, selection is made for a receiving base station that is best in signal receiving sensitivity among a plurality of receiving base stations to effect DGPS positioning.

That is, auto-tuning is made to a receiving base station for the DGPS data link receiver that is best in signal receiving sensitivity. Thereafter, DGPS operation is carried out with accuracy.

In a portable GPS receiver according to a seventh aspect of the invention, the DGPS receiving means continuously effects positioning during a time period of from starting measurement of traveling speed and a traveling distance to determining a traveling stride by the stride calculating means.

That is, positioning is continuously performed only during the time period of from starting measurement of a traveling speed and a traveling distance to determining a traveling stride. This minimizes the continuous positioning time period of the DGPS receiving means to a minimum.

In a portable GPS receiver according to an eighth aspect of the invention, evaluation is made after effecting GPS positioning whether a difference in advancing direction between a preceding time and a current time is within a given amount, and the positioning by the GPS receiver is continuously effected during a time period of moving a predetermined distance when there is a change in moving direction.

That is, after the GPS positioning, it is evaluated whether the difference in advancing direction between the preceding time and the present time is within a given amount or not. As a result, if there is a change in moving direction, the positioning of the GPS receiver is continuously made during a movement over a given distance. This can eliminate a large error occurring between a straight-lined moving distance obtained by coordinates by the GPS receiver and an actual distance, where a large difference exists in moving direction between two positioning points.

In a portable GPS receiver according to a ninth aspect of the invention, a moving direction detecting means is further provided for detecting a moving direction of the human body, wherein the positioning of the GPS receiver is controlled based on an output signal of the moving direction detecting means.

That is, means for detecting a moving direction of a human body is provided. The positioning of the GPS receiver is controlled based on a detected signal of that means. This enables recognition of two coordinates varying in moving direction without relying on a timer.

DETAILED DESCRIPTION OF THE PREFERRED EMBODIMENTS

Now a portable GPS receiver of this invention will be explained in detail hereinbelow with reference to the drawings.

Embodiment 1

Figure 1:
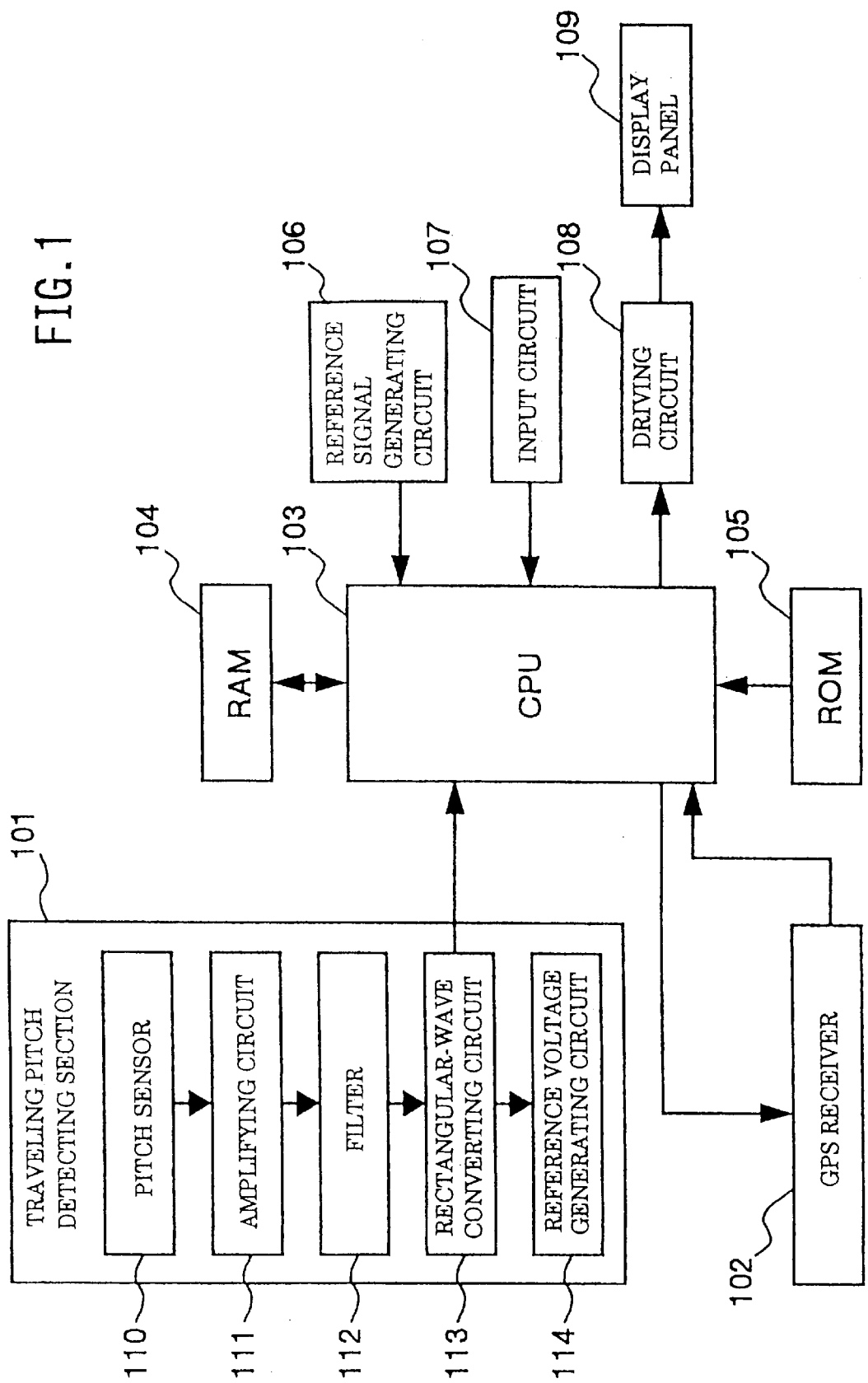
FIG. 1 is a block diagram showing a schematic structure of a portable GPS receiver according to Embodiment 1 of this invention.

Referring to FIG. 1, there is shown a block diagram showing an overall structure of a portable GPS receiver according to Embodiment 1. This portable GPS receiver includes a traveling pitch detecting section 101 as a traveling pitch detecting means to detect a traveling pitch of a human body, and a GPS receiver 102 as a GPS receiving means that is controlled in operation by a CPU hereinafter referred to and having a function of an antenna through a position calculating circuit to output position data to the CPU. The CPU 103 performs control on the overall receiver according to a predetermined program to effect operations such as pitch measurement.

Further, the receiver has a RAM 104 connected to the CPU 103 to serve as a register for data used in operation of the CPU 103, a ROM 105 for storing an operating program for the CPU 103, a reference signal generating circuit 106 for generating a reference frequency signal for operating the CPU 103, an input circuit 107 for inputting an input signal such as switches (not shown) to the CPU 103, a driving circuit 108 for driving a display panel, and a display panel 109 for displaying a traveling speed or traveling distance calculated by the CPU 103.

The traveling pitch detecting section 101 is structured by a pitch sensor 110 using a piezoelectric device or the like, an amplifying circuit 111 for amplifying an output signal from the pitch sensor 101, a filter 112 for removing a high frequency component thereof, a rectangular-wave converting circuit 113 for converting an output of the filter 112 into a rectangular wave, and a reference voltage generating circuit 114 for generating a reference voltage used for conversion into the rectangular wave.

Note that the rectangular-wave converting circuit 113 at its output is connected to the CPU 103. On the other hand, the CPU 103 has respective functions as a timer means, a stride calculating means, and a speed/distance calculating means.

Figure 2:
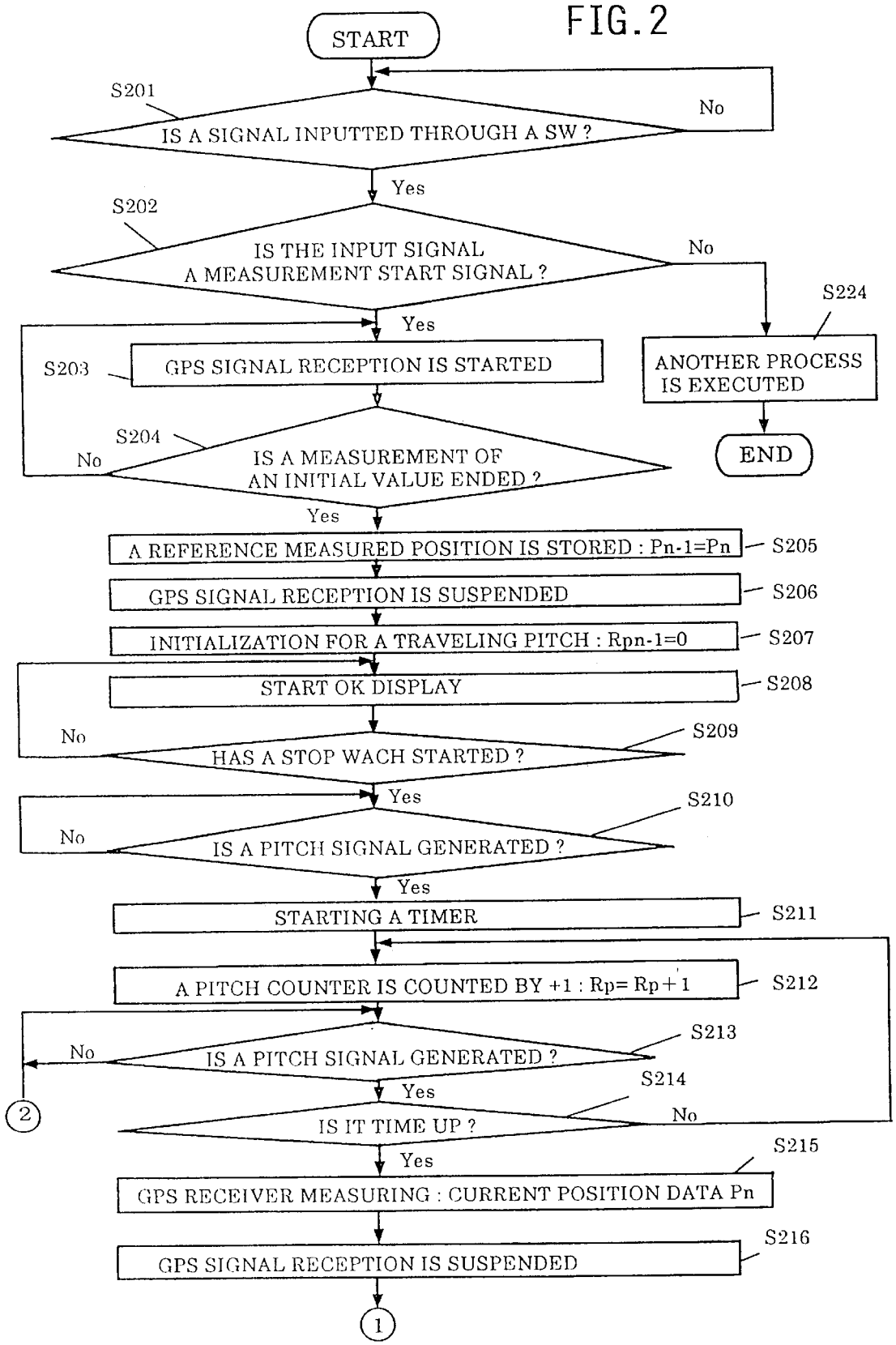
FIG. 2 is a flowchart for explaining an operational example according to Embodiment 1 of this invention.
Figure 3:
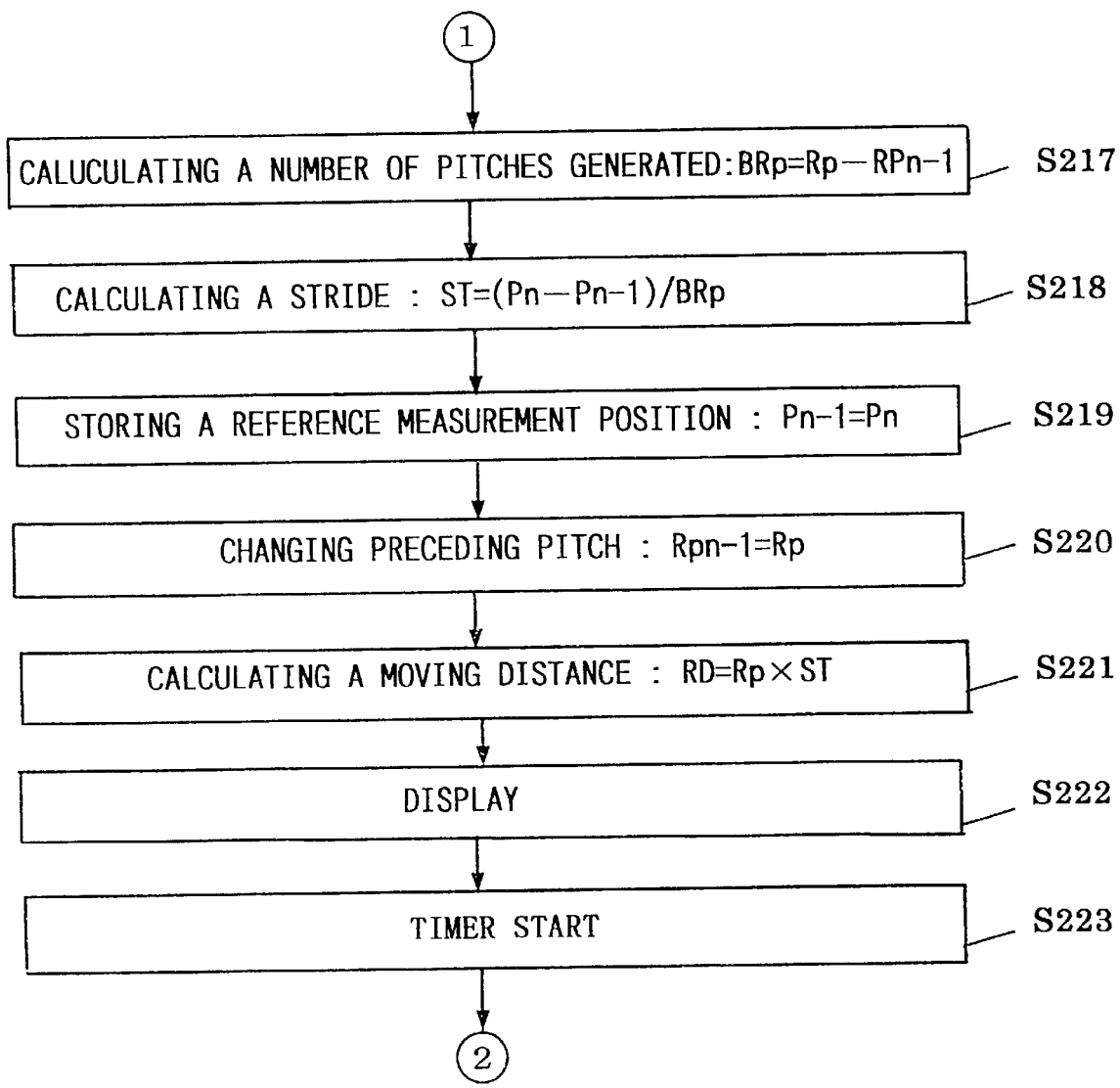
FIG. 3 is a flowchart for explaining an operational example according to Embodiment 1 of this invention.

Now explanations will be made of the operation of the portable GPS receiver structured as described above, using flowcharts. FIGS. 2 and 3 are flowcharts demonstrating a first operational example of Embodiment 1, and executed by the CPU 103. First, it is determined whether a signal is input through a switch (hereinafter referred to as "SW") from the input circuit 107 or not (S201). If the presence of an input through the switch is determined here, it is further determined whether or not the input signal is a measurement start signal as to a traveling distance or traveling speed (S202).

If the determination at the S202 is for a measurement start signal, GPS signal reception is started (S203). If the input signal is not a measurement start signal, another process is executed (S224) ending this operation. Meanwhile, if the GPS signal reception is started, it is then determined whether a measurement of an initial value is ended or not (S204). That is, when a measurement is started, GPS signal reception is started to perform positioning based on initial position data. The positioning operation is repeated until an initial position is measured.

If it is determined that the initial value measurement has ended, measured position data Pn is stored as a reference measured position Pn−1 for distance measurement to the RAM 104 (S205). Thereafter, the GPS signal reception is suspended in order to save power consumption (S206). Then, initialization is made for a traveling pitch to determine a traveling stride (Rpn−1=1) (S207). Here, since preparation is completed of traveling start by the traveling pitch initialization, a start display is generated on the display panel 109 to promote a user to travel (S208).

Then, it is determined whether a stop watch has been started or not (S209). Start display has been made until the stop watch is started (SWT start). That is, the above display is continued until the stop watch is started. Here, if it is determined that the stop watch has started, then it is determined whether there is occurrence of a pitch signal due to a movement of a body (S210). If the pitch signal has been generated, starting is made for a timer for determining an operating period of the GPS receiver 102 (S211).

After starting the timer, a pitch counter in the RAM 104 is incremented by +1 (Rp=Rp+1) (S212) to determine whether a pitch signal has been generated due to a body movement (S213). If generation of a pitch signal is determined, it is further determined whether time is up or not (S214). That is, the pitch signals generated until the time out of the tier are continuously counted by the pitch counter Rp.

If it is determined of time out that the timer has been reached by the step S214, operation of the GPS receiver 102 is resumed to measure current position data Pn (S215). After measuring the current position data, the GPS receiver 102 is again suspended in signal receiving operation to reduce power consumption (S216).

Then, calculation is made for a number of pitches Bp (Bp=Rp−Rpn−1) generated between the preceding measurement and the current measurement (S217). From the number of pitches generated between the preceding measurement and the current measurement, a stride ST (=(Pn−Pn−1)/BRp) between these measurements is calculated (S218).

After calculating the stride, newest position data Pn due to positioning is stored as a reference measurement position data Pn−1, for next stride calculation (S219). Similarly, a newest number of cumulative pitches Pn is stored as a preceding pitch Rpn−1 for next stride calculation (S220). Thereafter, a moving distance is calculated from the cumulative pitch and the stride (S221), and displayed on the display panel 109 (S222). Thereafter, restarting is made for a timer that determines the operating period of the GPS receiver (S223), and the process returns to the step S213 that is in a state of waiting for a next pitch signal, repeating the operation in a similar manner.

That is, the operation in the flowchart, from the pitch count (S212) to the timer start (S223), is repeatedly effected until completing calculation of a moving distance and moving speed by a next SW input. As a result, the stride is recalculated by a period of time up of the timer, displaying a distance and speed. Note that no speed calculating steps are shown in FIGS. 2 and 3 because the step can be readily calculated if distance information and time information are present.

Meanwhile, the operational example shown in FIGS. 2 and 3 was simplified in operational explanation in order to facilitate understanding the fundamental operation of this invention. Due to this, it may be assumed that no display be made until time-up of the timer determining the operational period of the GPS receiver, or a cumulative distance from the start be calculated by immediately preceding stride data each time the timer becomes time-up. In a second operational example of this embodiment 1, therefore, operation control is executed according to flowcharts shown in FIGS. 4 and 5 explained hereinbelow.

Figure 4:
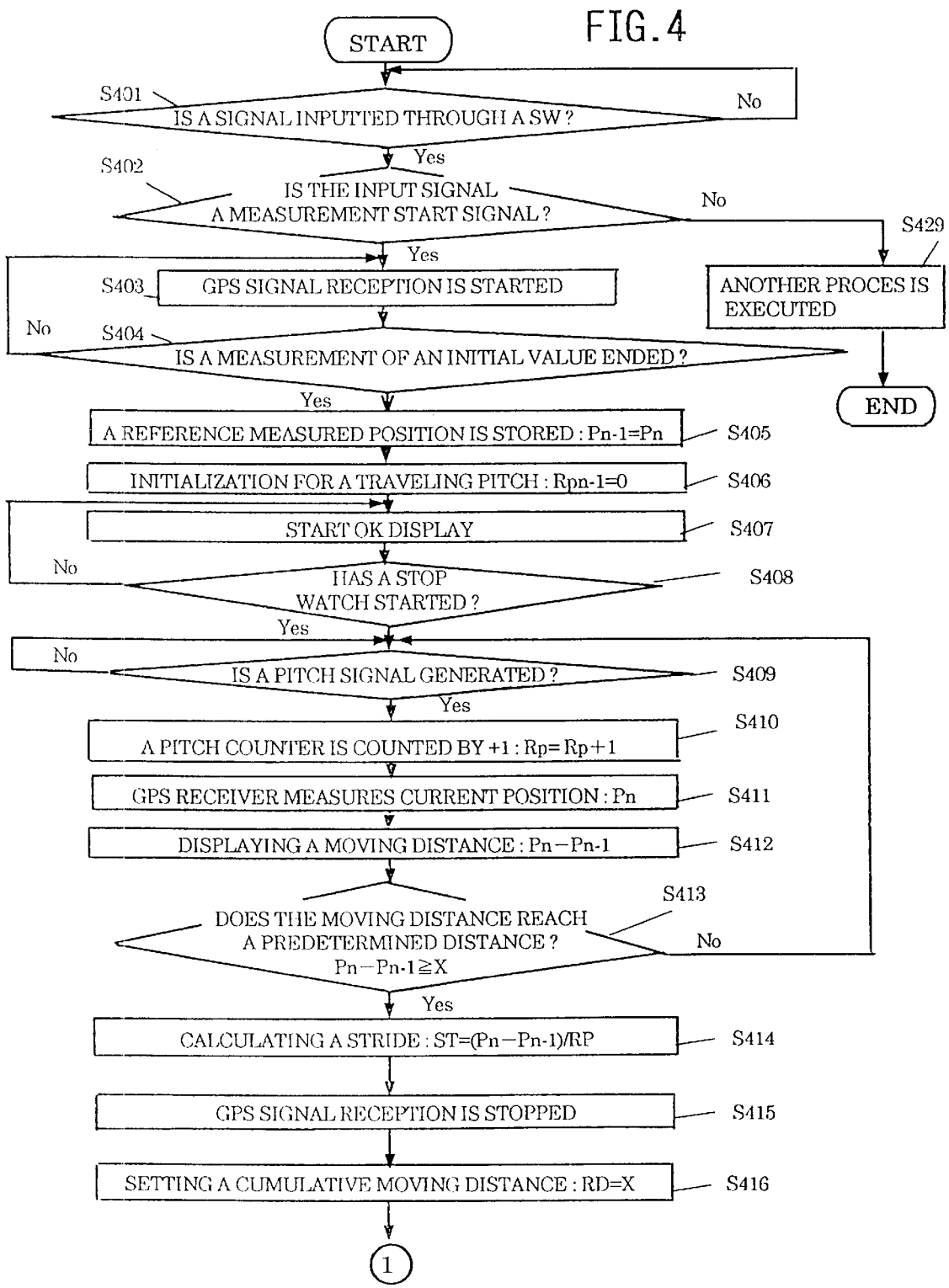
FIG. 4 is a flowchart for explaining an operational example according to Embodiment 2 of this invention.
Figure 5:
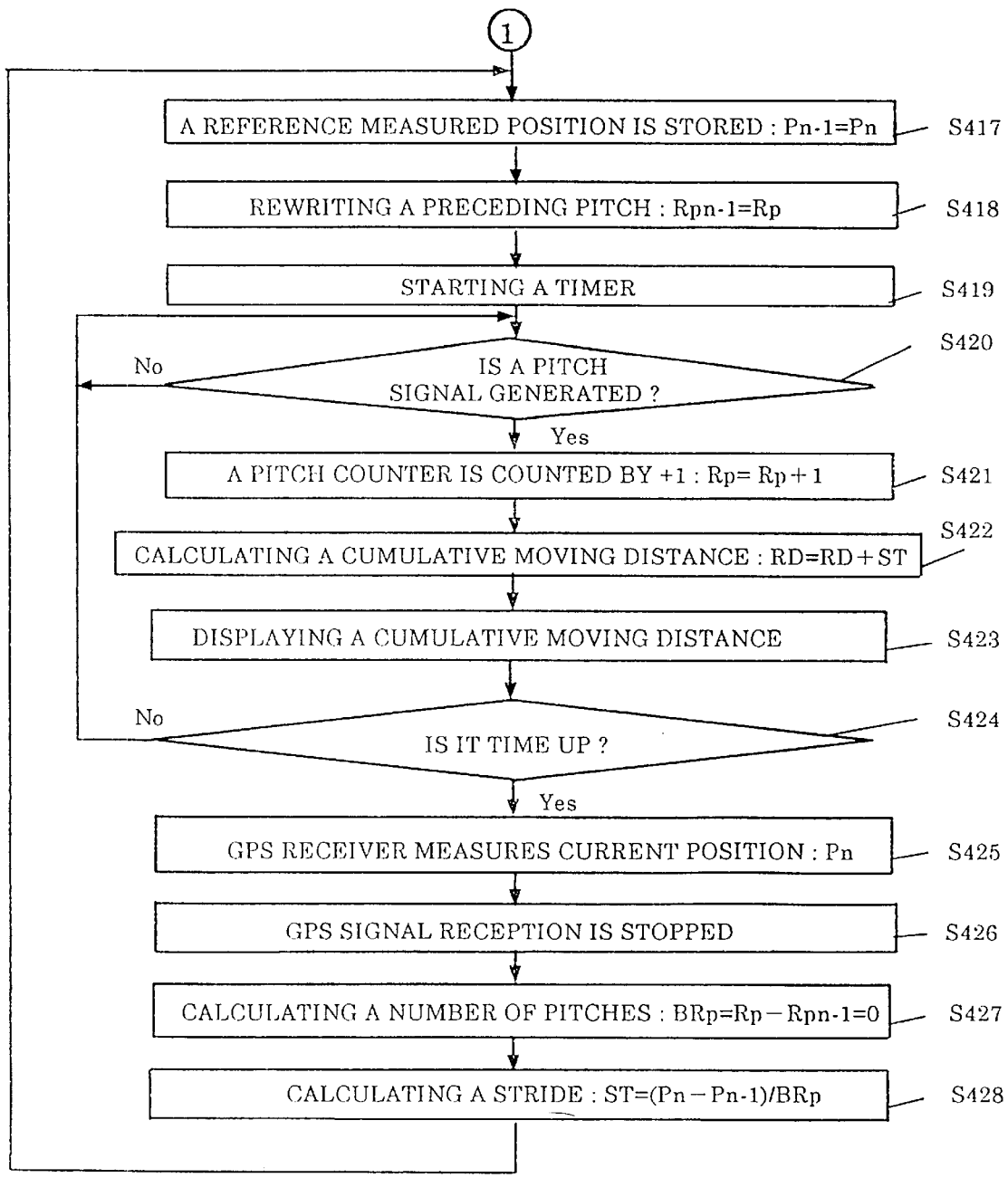
FIG. 5 is a flowchart for explaining an operational example according to Embodiment 2 of this invention.

FIGS. 4 and 5 are flowcharts showing a second operational example according to Embodiment 1, which are executed by the CPU 103. In an operation herein, it is first determined whether a signal is inputted through the SW from the input circuit 107 (S401) similarly to the first operational example stated above. If the determination is a presence of a signal input by the switch, it is further determined whether the input signal is a measurement start signal for traveling distance or traveling speed or not (S402).

If a measurement start signal is determined at the step S402, GPS signal reception is started (S403). If no measurement start signal is determined, another process is executed (S429), ending this operation. On the other hand, if a GPS signal reception is stated, it is then determined whether an initial value measurement is ended or not (S404). That is, if a measurement is started, a GPS signal reception is started to position for initial position data. The operation of positioning is repeatedly executed until an initial position is measured.

If the measurement of an initial value has ended as determined above, position data Pn thus positioned is stored as a reference measurement position Pn−1=Pn for distance measurement to the RAM 104 (S405). Then, initialization is made for a traveling pitch for determining a traveling stride (Rpn−1=0) (S406). Here, travel start has been prepared by the traveling pitch initialization, and start display is made ion the display panel 109 in order to promote the user to travel (S407).

It is then determined whether the stop watch is started or not (S408). The start display is made until the stop watch is started (SWT start) is determined. That is, the above display operation is continued until the stop watch is started. If it is determined here that the stop watch has been started, it is determined whether a pitch signal is generated due to body movement (S409).

If it is determined in the above step that the user is traveling and a pitch signal is generated, the pitch counter Rp in the RAM 104 is incremented by +1 (S410). After incrementing pitch by +1, the GPS receiver 102 continuously in a signal receiving state again effects a position operation (S411). After positioning, a moving distance is calculated from newest position data Pn and the reference position data Pn−1, and is displayed on the display panel 109 (S412). It is then determined whether this moving distance reaches a predetermined distance X (Pn−Pn−1≧X) or not (S413). If the predetermined distance X is not reached, the steps S409–S413 are executed repeatedly.

On the other hand, if the predetermined distance X is reached as determined above, a traveling stride is calculated from the traveling distance, moving distance and cumulative number of pitches during that time (S414). After computing the stride, the GPS signal receiver 102 is stopped in operation in order to save power consumption (S415). After stopping the operation of the GPS receiver 102, the moving distance X so far is set as a moving distance variable RD (S416). After setting the moving distance, the reference measurement position Pn−1 is stored for the next stride computation (S417) to rewrite the preceding pitch Rpn−1 (S418). Further, the timer is started (S419) to determine whether a pitch signal is generated or not (S420).

If a pitch signal is generated is determined, the pitch counter Rp is incremented by +1 (S421), and the stride determined above is added to the moving distance variable RD (S422). Thereafter, this addition result is displayed on the display panel 109 (S423), and it is determined whether it is time-up or not (S424).

If the determination is not time-up, the operation of from the pitch signal waiting state S420 to the cumulative moving distance display S423 is repeatedly effected. On the other hand, if time-up is determined, the GPS receiver 102 is again placed in an operative state to perform positioning (S425). After completing the positioning, the GPS receiver 102 is stopped in operation (S426), and calculation is made for a number of pitches BRp (=Rp~Rpn−1) during the positioning (S427). After determining the number of pitches, a stride ST (=(Pn−Pn−1)/BRp) is calculated (S428). After calculating the above stride, the variables Pn−1 and Rpn−1 are changed for the next stride (S417, S418), and the timer is again started (S419).

By performing the above operation, a newest stride can be determined that is at an interval set by the timer. It is possible to determine a traveling distance and traveling speed based on the stride that is varying in a real time manner.

Figure 6:
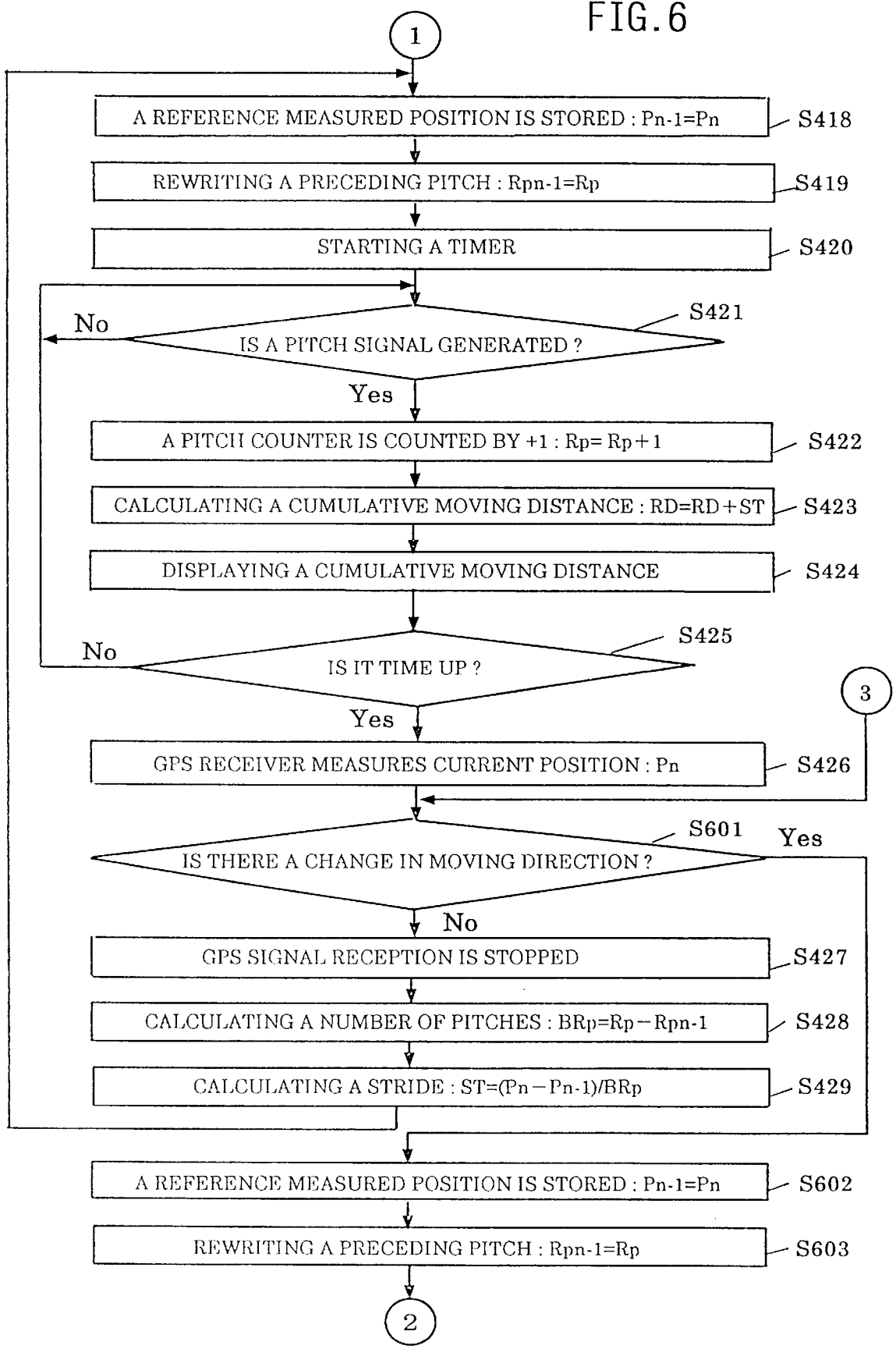
FIG. 6 is a flowchart for explaining an operational example according to Embodiment 3 of this invention.
Figure 7:
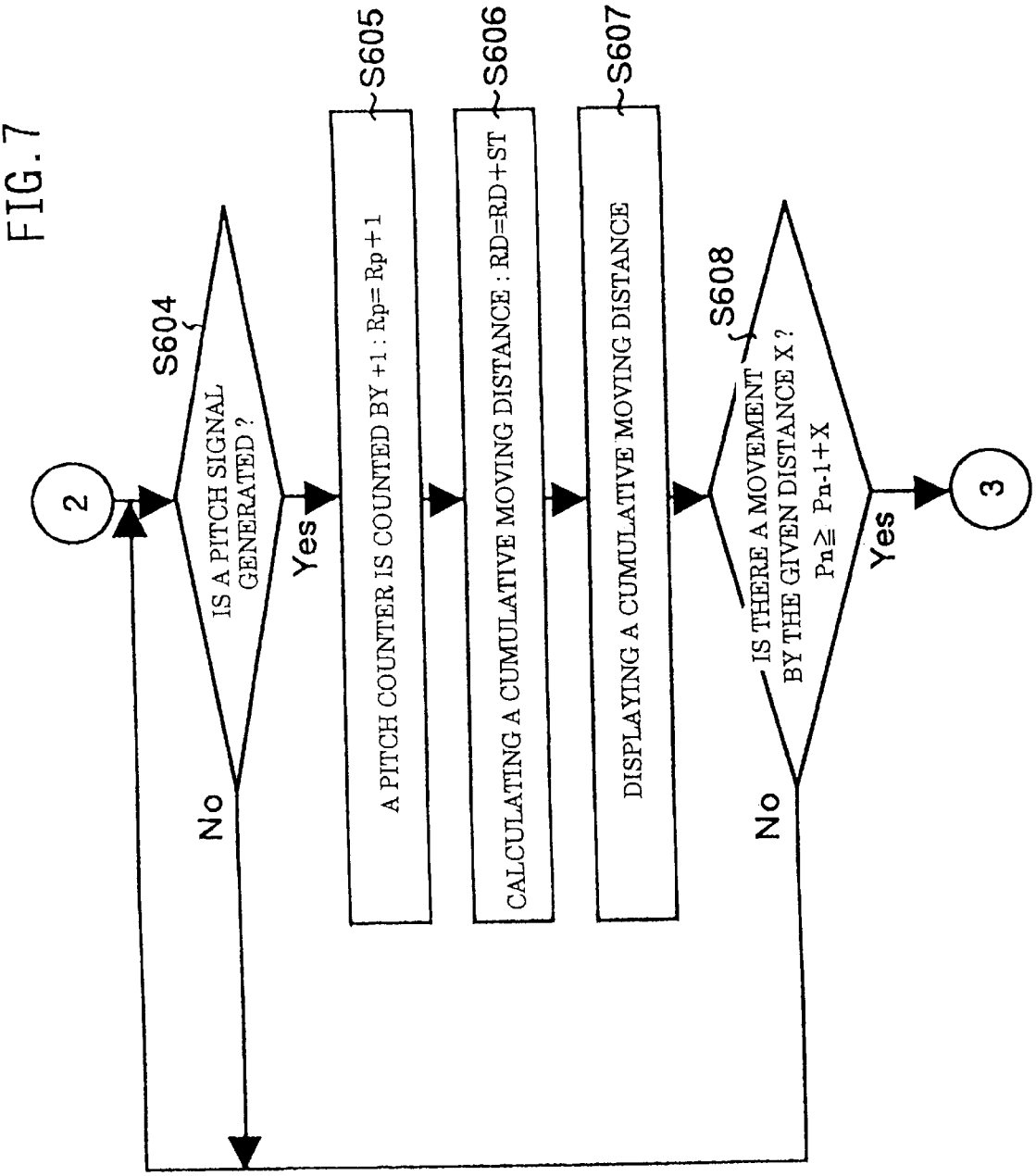
FIG. 7 is a flowchart for explaining an operational example according to Embodiment 3 of this invention.

Meanwhile, where there is a considerable difference in moving direction between two positioning points, there is a possibility that a significant error is involved in between a straight-line form of the moving distance determined between coordinate locations by the GPS receiver 102 and an actual moving distance. To cope with this, this third operational example carries out operation in accordance with a flowchart shown in FIG. 6. That is, the operation as explained with reference to FIGS. 4 and 5 is added by an operation of steps S601–S608 shown in FIGS. 6 and 7. Accordingly, the characters or symbols which are the same as those of FIGS. 4 and 5 are similar in operation, and explanation thereof will be omitted.

That is, the GPS positioning operation up to immediately before (step S425) is same as that of FIGS. 4 and 5. Addition is made of a process for a case where there is a change in moving direction to after the execution of the GPS positioning, wherein it is evaluated/determined at steps S601 and subsequent whether or not a difference in moving direction lies within a given amount between the preceding positioning and the current positioning. Incidentally, the GPS receiver 102 has also a function to output information on traveling direction.

At a step S601, where an evaluation result is within a given amount (no change), the GPS signal reception is stopped (S426) to effect a similar operation to the above. On the other hand, if the evaluation result is in excess of the given amount (there is change), the GPS receiver 102 is continuously operated during travel by a certain given distance from a current position to change the variables Pn−1 and Rpn−1 for a next stride calculation (S602, S603). It is then determined whether a pitch signal is generated or not (S604), becoming a state of waiting for a pitch signal.

In the above, when it is determined that a pitch signal is generated, the pitch counter Rp is incremented by +1 (S605), and a cumulative traveling moving distance RD (=RD+ST) is determined from the stride ST (S606) for display on display panel 109 (S607). Then, it is determined whether there is a movement by a given distance X from the preceding positioning point or not (S608). If there is no movement by the given distance X, steps S604–S607 are executed. On the other hand, if the it is determined that there is a movement by the given distance X, the process returns to the step S601 to repeatedly effect the operation of the subsequent.

As stated above, the GPS receiver 102 continuously operates until positioning data is obtained between two points that involves change in moving direction and not greater than a predetermined amount. As a result, a traveling stride is obtainable with accuracy.

The embodiment stated above, therefore, calculates a traveling stride from location information as to two points positioned and a number of pitches determined during the positioning, and determines moving distance and speed from the stride and the pitches. This makes it possible to continue distance and speed measurements even at a location where GPS radio waves are difficult to receive (e.g. in tunnels, at valleys between buildings). Also, because the moving distance and speed is calculated by utilizing a stride automatically determined, the distance and speed measurements are possible even where the GPS receiver 102 requiring large electric power is operated intermittently.

Embodiment 2

Now explanations will be made of Embodiment 2, wherein a moving direction detecting means is provided to detect a moving direction of a human body and the GPS receiver 102 is controlled in positioning operation depending upon an output signal from the moving direction detecting means.

Figure 8:
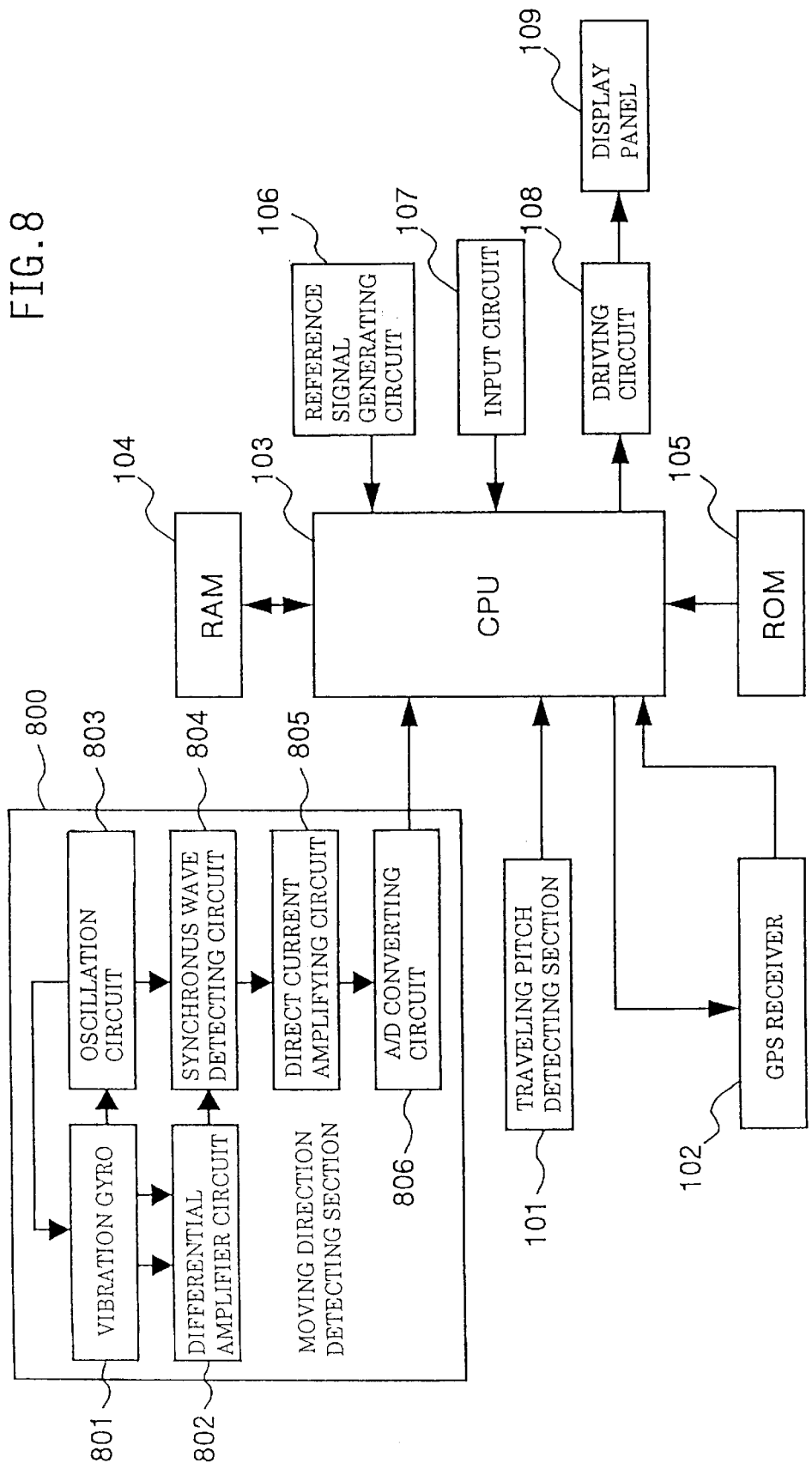
FIG. 8 is a block diagram showing a schematic structure of a portable GPS receiver according to Embodiment 2 of this invention.

FIG. 8 is a block diagram showing a portable GPS receiver according to Embodiment 2. This portable GPS receiver has added thereto a moving direction detection section 800 as a movable direction detecting means for detecting a moving direction of a human body. Accordingly, other elements and their functions which are the same as those of Embodiment 1, are given the same characters or symbols and detailed explanations thereof are omitted.

In FIG. 8, a moving direction detection section 800 is structured by a vibration gyro 801 for detecting angular speed variation of movement of a human body, a differential amplifier circuit 802 for differential-amplifying an output voltage on a detecting terminal of the vibration gyro, an oscillation circuit 803 to cause the vibration gyro 801 to oscillate, a synchronous wave detecting circuit 804 to extract only a Coriolis signal, a direct-current amplifying circuit 805 for d-c amplifying an output voltage of the synchronous wave detecting circuit 804, and an A/D converting circuit 806 for converting an output voltage of the direct current amplifying circuit 805 into digital data. Also, when the vibration gyro 801 has a rotational angular speed, a digital numeral signal proportional to an acceleration thereof is outputted to the CPU 103.

Figure 9:
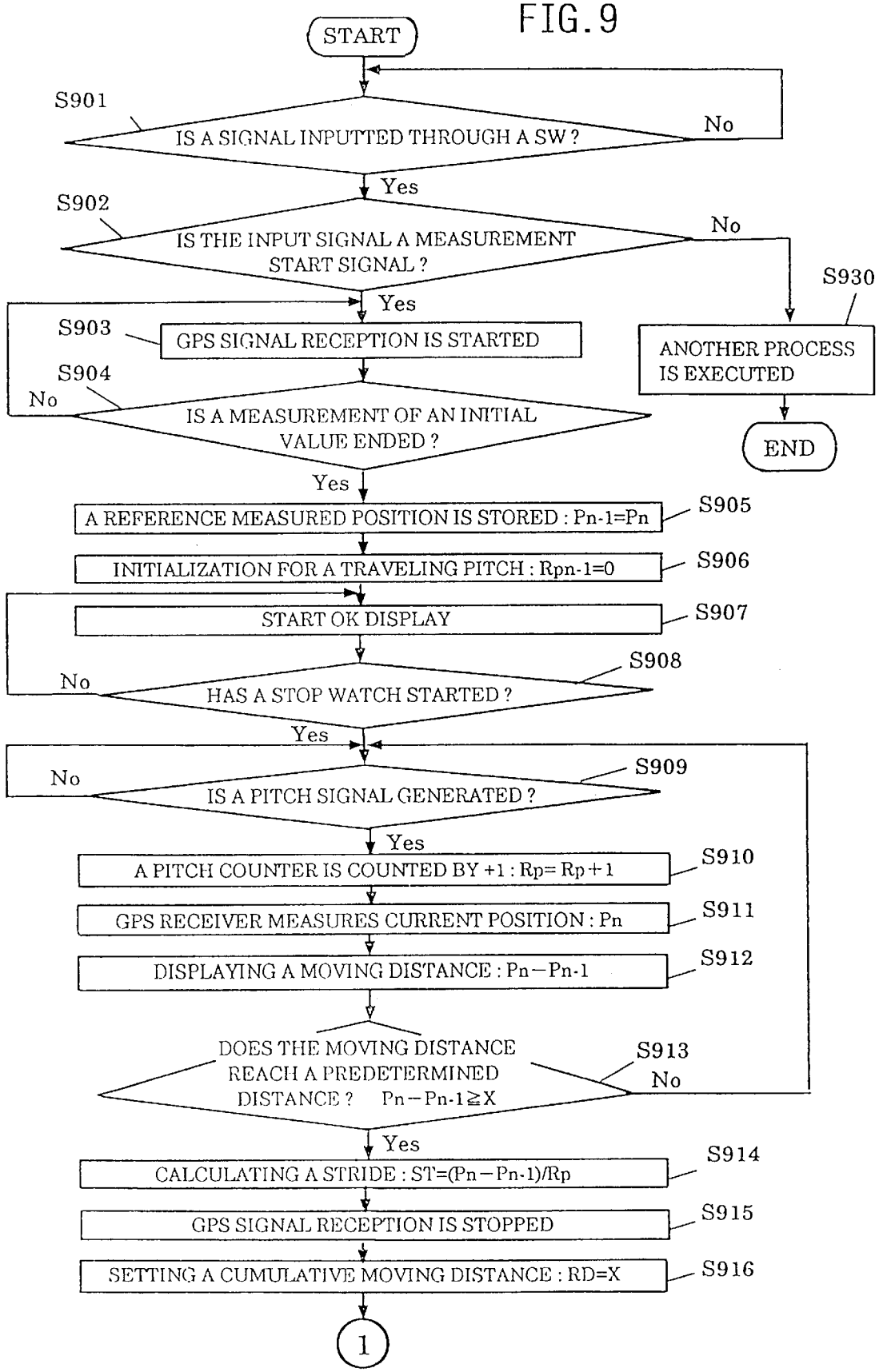
FIG. 9 is a flowchart for explaining an operational example according to Embodiment 2 of this invention.
Figure 10:
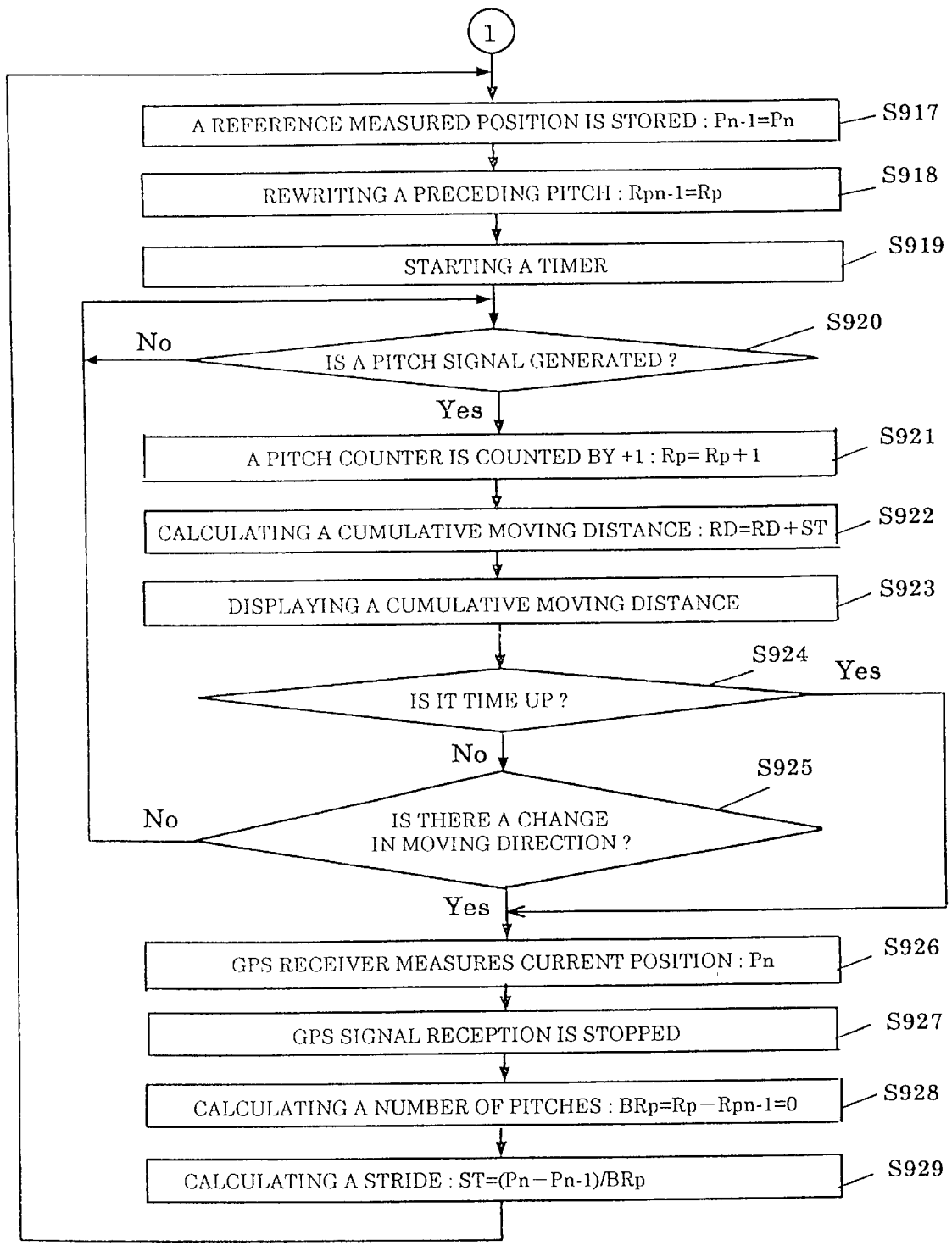
FIG. 10 is a flowchart for explaining an operational example according to Embodiment 2 of this invention.

Now explanations will be made of the operation of the portable GPS receiver constructed as described above, with reference to a flowchart. FIGS. 9 and 10 are flowcharts showing an operational example according to Embodiment 2, and are executed by the CPU 103. This operation is characterized in that the variation in moving direction is determined, at a step S925 hereinafter referred to, depending upon an output of the moving direction detecting section 800, to thereby carry out subsequent operations based on that determination. Other operations are basically similar to those of FIGS. 4 and 5. The operation will be explained in detail hereinbelow.

In the figure, it is first determined whether a signal is inputted through the SW from the input circuit 107 or not (S901). If there is an input through the switch that is determined, it is further determined whether or not the input signal is a measurement start signal for measuring traveling distance and speed (S902).

If it is determined that the input signal a measurement start signal at step S902, GPS signal reception is started (S903), while if not a measurement start signal, another process is executed (S930), ending this operation. If GPS signal reception is started, it is then determined whether an initial value measurement is completed or not (S904). That is, when measurement is started, GPS signal reception is started to perform positioning as to initial position data wherein the positioning is repeatedly executed until an initial position is measured.

If an initial value measurement completion has been determined, position data Pn obtained by the positioning is stored as a reference measurement position Pn−1=Pn into the RAM 104 (S905). Then initialization is made (Rpn−1=0) for a traveling pitch for determining a traveling stride (S906). Since preparation is completed for starting traveling due to the initialization of the traveling pitch a, start display is generated on the display panel 109 to promote travel to a user (S907).

Thereafter, it is determined whether the stop watch is started or not (S908) to perform the start display until the stop watch has been started (SWT start). That is, this display is continued until the stop watch is started. Here, if the stop watch start has been determined, it is determined whether a pitch signal is generated due to a movement of the body or not (S909).

In the above operation, if the user starts traveling and it is determined that a pitch signal is generated, the pitch counter Rp in the RAM 104 is incremented by +1 (S910). After incrementing the pitch by +1, the GPS receiver 102 continuously in a reception state again carries out positioning (S911). After positioning, a moving distance is calculated from newest position data Pn and reference measured position data Pn−1 and displayed on the display panel 109 (S902). It is then determined whether this moving distance reaches a predetermined given distance X or not (S913). If the given distance X is not reached, the above steps S909–S913 are repeatedly executed.

Meanwhile, if the given distance X is reached, a traveling stride is calculated from the traveling or moving distances and a number of cumulative pitches in the duration thereof (S914). After calculating the stride, the GPS receiver 102 is suspended in operation in order to reduce power consumption (S915). After stopping the operation of the GPS receiver 102, the moving distance X reached so far is set to a moving distance variable RD (S916). After setting the moving distance, the reference measured position Pn−1 is stored for a next stride calculation (S917) to rewrite the preceding pitch Rpn−1 (S918). Further, the timer is started (S919) to determine whether a pitch signal is generated or not (S920).

If a pitch signal is generated, the pitch counter Rp is incremented by +1 (S921), and the stride determined above is added to the moving distance variable RD (S922). Thereafter, the result of this addition is displayed on the panel 109 (S923), and it is determined whether it is time-up or not (S924).

If the determination is not time-up, it is further determined by the moving direction detecting section 800 whether there is change in moving direction or not (S925). If it is determined here that there has been a change in moving direction, the GPS receiver 102 is placed in an operative state again and performs positioning (S926). After positioning, the GPS receiver 102 is suspended from operation (S927) and a number of pitches BRp (=Rp−Rpn−1) during the positioning is calculated (S928). After determining the number of pitches, a stride ST (=(Pn−Pn−1)/BRp) is calculated (S929).

After calculating the stride, the variables Pn−1 and Rpn−1 are changed for a next stride (S917, S918) and the timer is again started (S919).

That is, in the above operation the moving direction of the human body is detected at the step S925 even before time-up. The variation in moving direction is determined by whether the output of the A/D converting circuit 806 that varies depending upon angular acceleration of the vibration gyro exceeds threshold value or not. If exceeding the threshold value, it is recognized that there is change in moving direction of the human body. When the change of moving direction is recognized, the timer is immediately reset and the GPS receiver 102 effects positioning (S926–S929). As a result, it is possible to recognize two points varying in moving direction without relying upon use of a timer.

Incidentally, in this embodiment a piezoelectric type acceleration sensor used as a pitch sensor was explained by using a vibration type gyro as a gyro. However, the objective of this invention can be achieved by other pitch sensors or gyros.

Embodiment 3

Meanwhile, the usual GPS system is intentionally lowered in accuracy due to a reason of national defense (SA: Selective Availability). This results in an accuracy of positioning of approximately ±30 m to 100 m. For this reason, Embodiment 3 is explained as an example wherein accuracy is improved by using a DGPS system.

First, a DGPS (Differential Global Positioning System) will be explained. GPS is a system developed for U.S. Military use, and released for private utilization. This system however, is intentionally lowered in accuracy due to military reasons. DGPS is used in order to compensate for this lowered accuracy. In DGPS, base stations in known position are provided on the earth to calculate positions with radio wave from a GPS satellite. Errors are determined from a correct base position and a calculated position, to thereby give information to various users.

In Japan, experiments with so-called FM multiplex, wherein DGPS data is carried on FM broadcasting, are being made and brought into practical applications. This DGPS transmitting means involves the utilization of portable radio transceivers, telephone lines including handy telephones, leased radio lines, beacon radio waves, communication satellites, navigation satellites, and so on.

Incidentally, there is already in service a world-wide DGPS system mainly for ships. In this system, reference signal receiving points are located at various places around the world so that pseudo distance corrected data is transmitted via a satellite to the user. In such a case, there required signal receiving facilities for the navigation satellite (INMALSAT).

Figure 11:
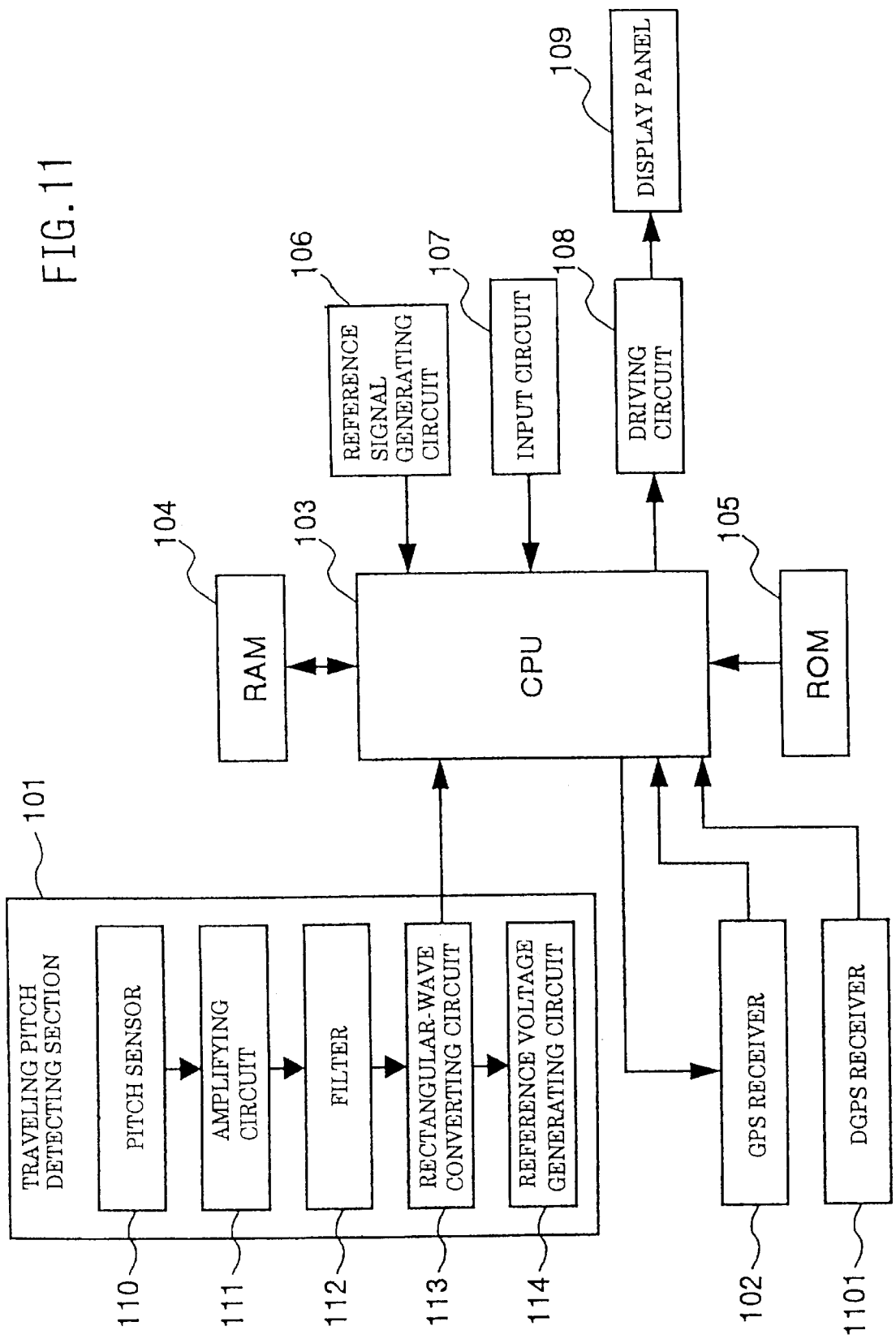
FIG. 11 is a block diagram showing a schematic structure of a portable GPS receiver according to Embodiment 3 of this invention.

FIG. 11 is a block diagram showing the structure of a portable GPS receiver according to Embodiment 3. This portable PS receiver is structured by adding a DGPS receiver 1101 as a DGPS receiving means to the receiver shown in FIG. 1 (or FIG. 8). Also, the CPU 103 has a function of auto-tuning in addition to the functions stated in the above embodiments. Accordingly, other structural elements and functions similar to those of Embodiment 1 are denoted by the same numerals or symbols as FIG. 1, and detailed explanations thereof are omitted.

Figure 15:
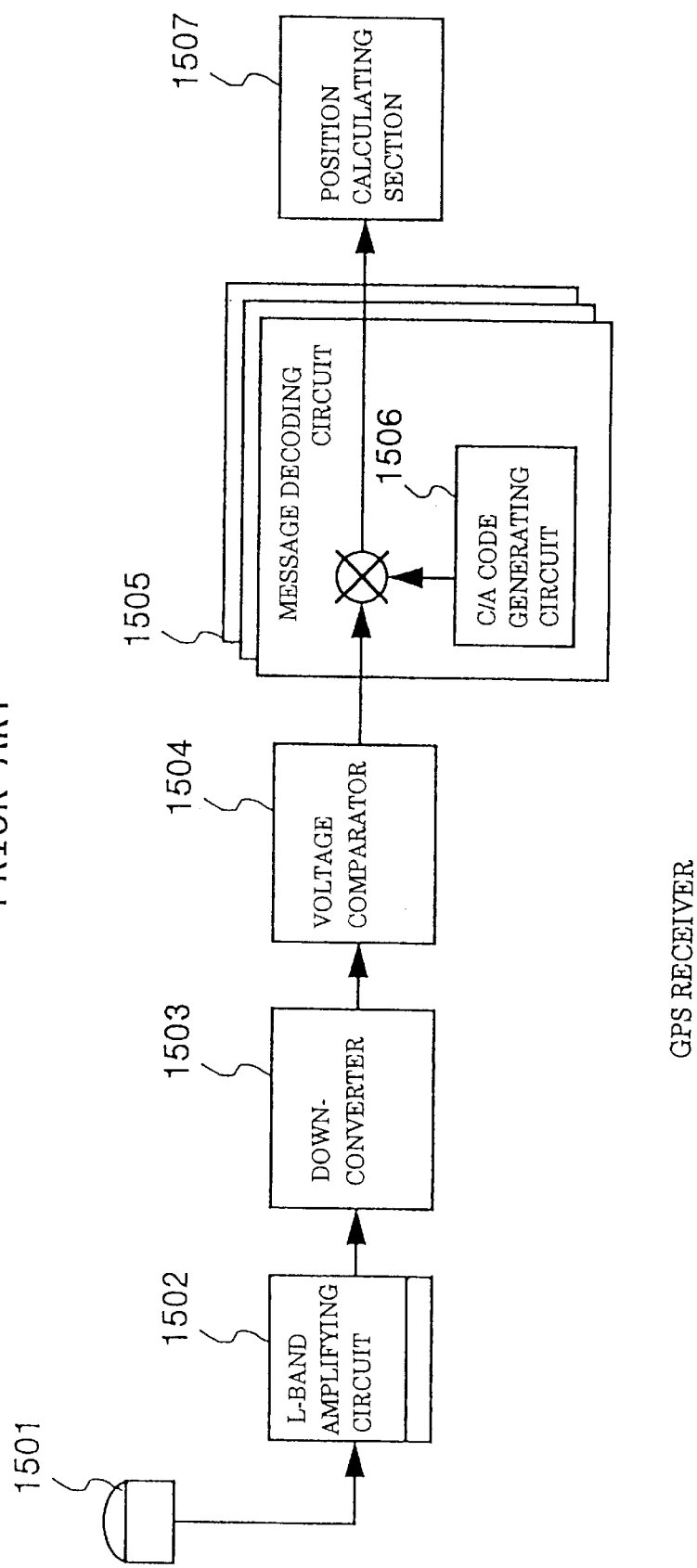
FIG. 15 is a block diagram showing a schematic structure of a GPS receiver.
Figure 16:
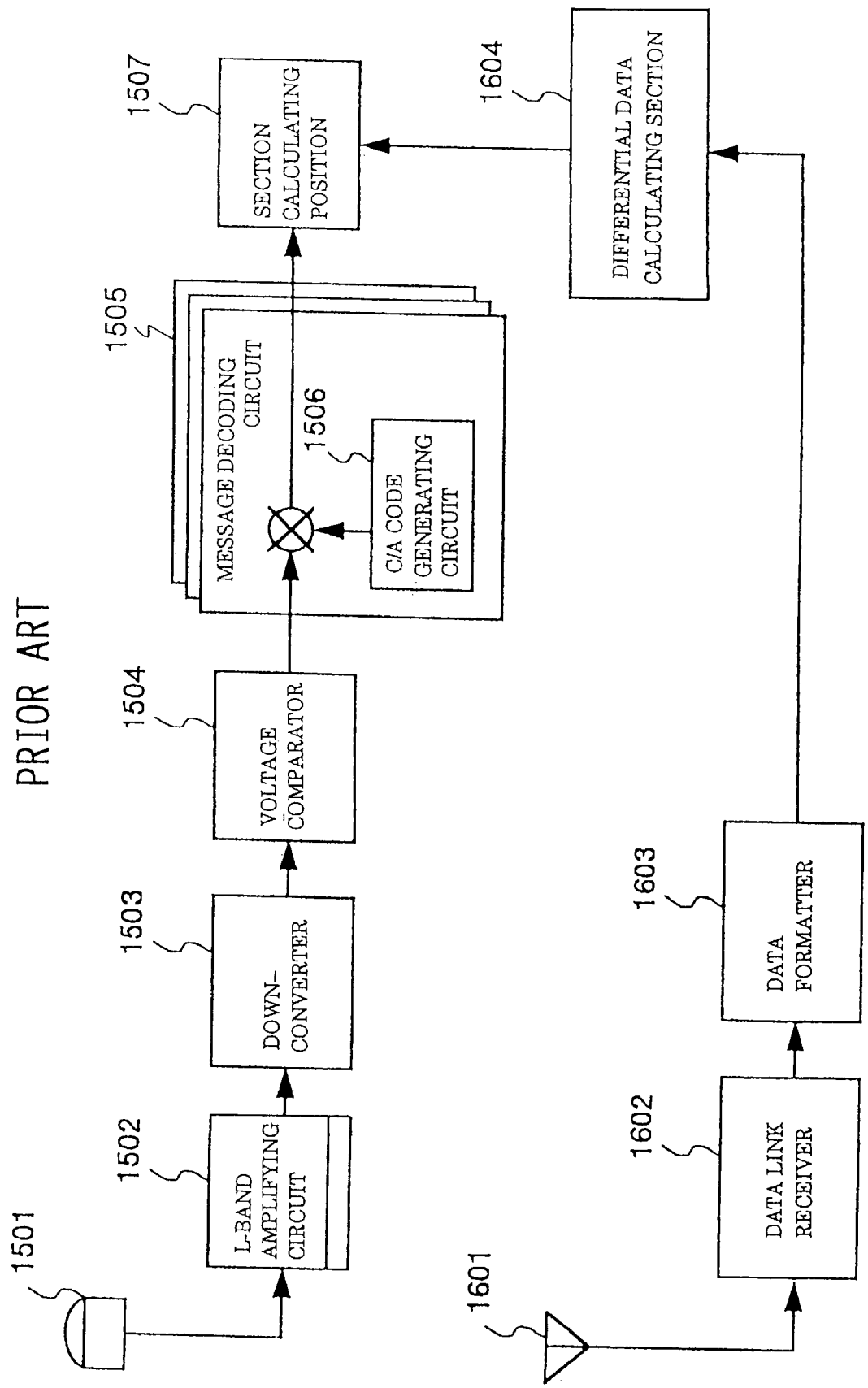
FIG. 16 is a block diagram showing a schematic structure of a GPS receiver.

Also, FIG. 16 is a block diagram showing the structure of the DGPS receiver. This DGPS receiver is structured by adding, to the GPS receiver of FIG. 15, an antenna 1601 for obtaining DGPS correction data, a data link receiver 1602 for receiving position information of reference base stations, a data formatter 1603 for binary-coding differential data and arranged into a predetermined form, and a differential data calculating section 1604 for calculating differential correction data and outputting the same to a positioning calculating section 1507.

Incidentally, this embodiment employs a translocation-scheme DGPS as a method of DGPS positioning. This system is structured by a reference station (fixed) previously and accurately determined in position and receivers of users. The reference station receives signals from GPS satellites and detects clock errors, orbit errors, ionospheric approximate errors, and tropospheric delay errors. Also, the reference station carries out broadcast to various places through data lines utilizing radio waves with a pseudo distance error portion as a correction value. On the other hand, the user's receiver from each GPS satellite, determining accurate positioning.

Figure 12:
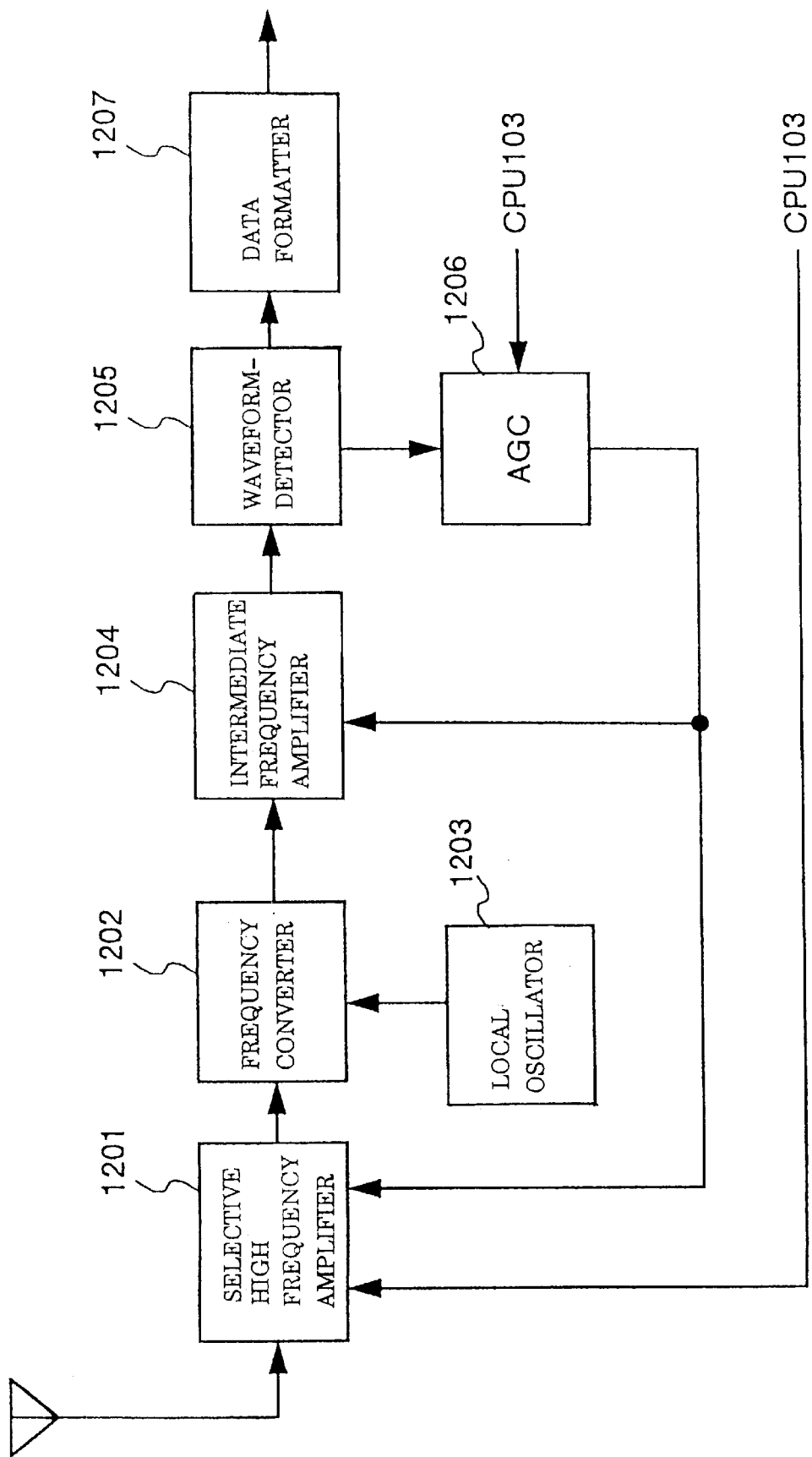
FIG. 12 is a block diagram showing a schematic structure of a data link receiver according to Embodiment 3 of this invention.

FIG. 12 is a block diagram showing the structure of a data link receiver in a DGPS receiver. In the figure, 1201 is a selective high-frequency amplifier for selectively amplifying a carrier frequency of an FM wave that is received. The amplifying ratio is controlled by an AGC 1206 (described below), while the frequency is controlled by the CPU 103. Also, 1202 is a frequency converter for converting a modulated carrier frequency into a low frequency by using a difference between the carrier frequency outputted by the selective high-frequency amplifier 1201 and an output frequency of a local oscillator 1203 (described below). 1203 is a local oscillator for generating a frequency signal to generate a beat frequency for a purpose of lowering the carrier frequency.

Also, 1204 is an intermediate frequency amplifier for amplifying an intermediate frequency converted into a low frequency by the frequency converter 1202. 1205 is a waveform-detector for demodulating a modulated signal. 1206 is an AGC (Auto Gain Control) for varying the amplification ratio of the intermediate frequency amplifier 1204 and the selective high-frequency amplifier 1201 according to an amplitude of the demodulated data to maintain the amplitude of an output signal of the waveform-detector 1205 constant, so that a negative feed-back loop to the intermediate frequency amplifier 1204 and the selective high-frequency amplifier 1201 can be cut off by a control signal from the CPU 103. Also, 1207 is a data formatter for binary-coding demodulated differential data to arrange the same into a predetermined format.

First explained will be operation of automatically changing a receiving base station for the data link receiver by using GPS positioning data.

Figure 13:
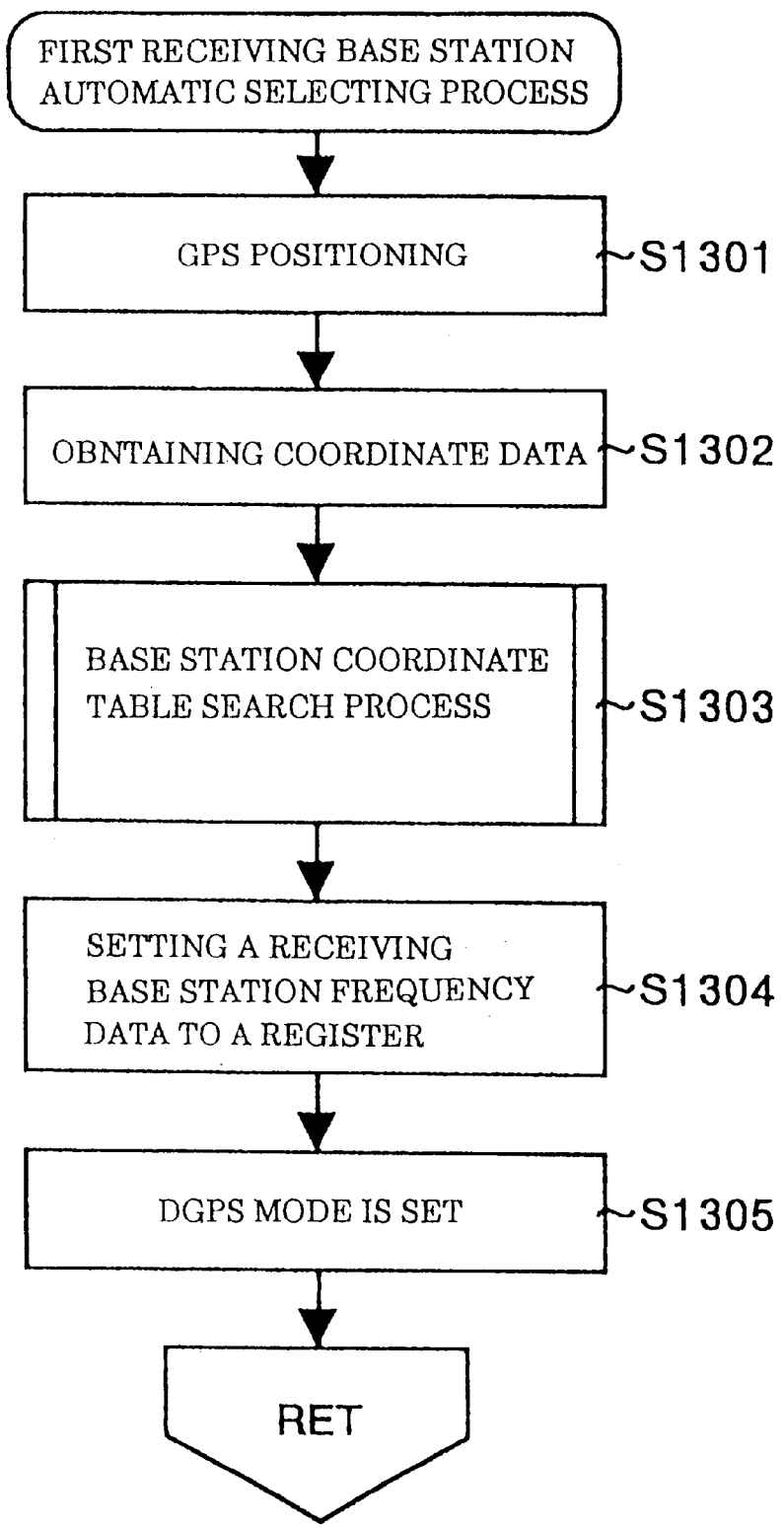
FIG. 13 is a flowchart for explaining a first operational example of a receiving base station auto-selecting process according to Embodiment 3 of this invention.

FIG. 13 is a flowchart showing a first operational example of a receiving base station automatic selecting process. Incidentally, the tuning operation is performed by the CPU 103. First, GPS positioning is carried out by the GPS receiver 102 (S1301) to obtain coordinate date (S1302). Subsequently, since a coordinate of FM broadcast stations and a frequency data table are written in the ROM 105, a base station coordinate table search process is carried out to select an FM broadcast station nearest to the coordinate data received (S1303). Further, the CPU 103 sets received frequency data to a register for controlling a received frequency of the selective high-frequency amplifier 1201 (S1304). Here, the above data is set, and then a DGPS mode is set (S1305). That is, in a DGPS mode, the operation processes as stated in Embodiments 1 and 2 are carried out to calculate a moving distance and speed of a human body.

Now explanations will be made of an auto-tuning operation to a base station that is best in signal receiving sensitivity among the receiving base stations for the data link receiver. For example, it is determined from coordinate data whether to effect an auto-tuning function or not. For example, the frequency of the data link receiver is unconditionally determined as 78 MHz within a radius of 10 km of a Bay FM transmitting station. An operational procedure therefor will be explained hereinbelow using a flowchart.

Figure 14:
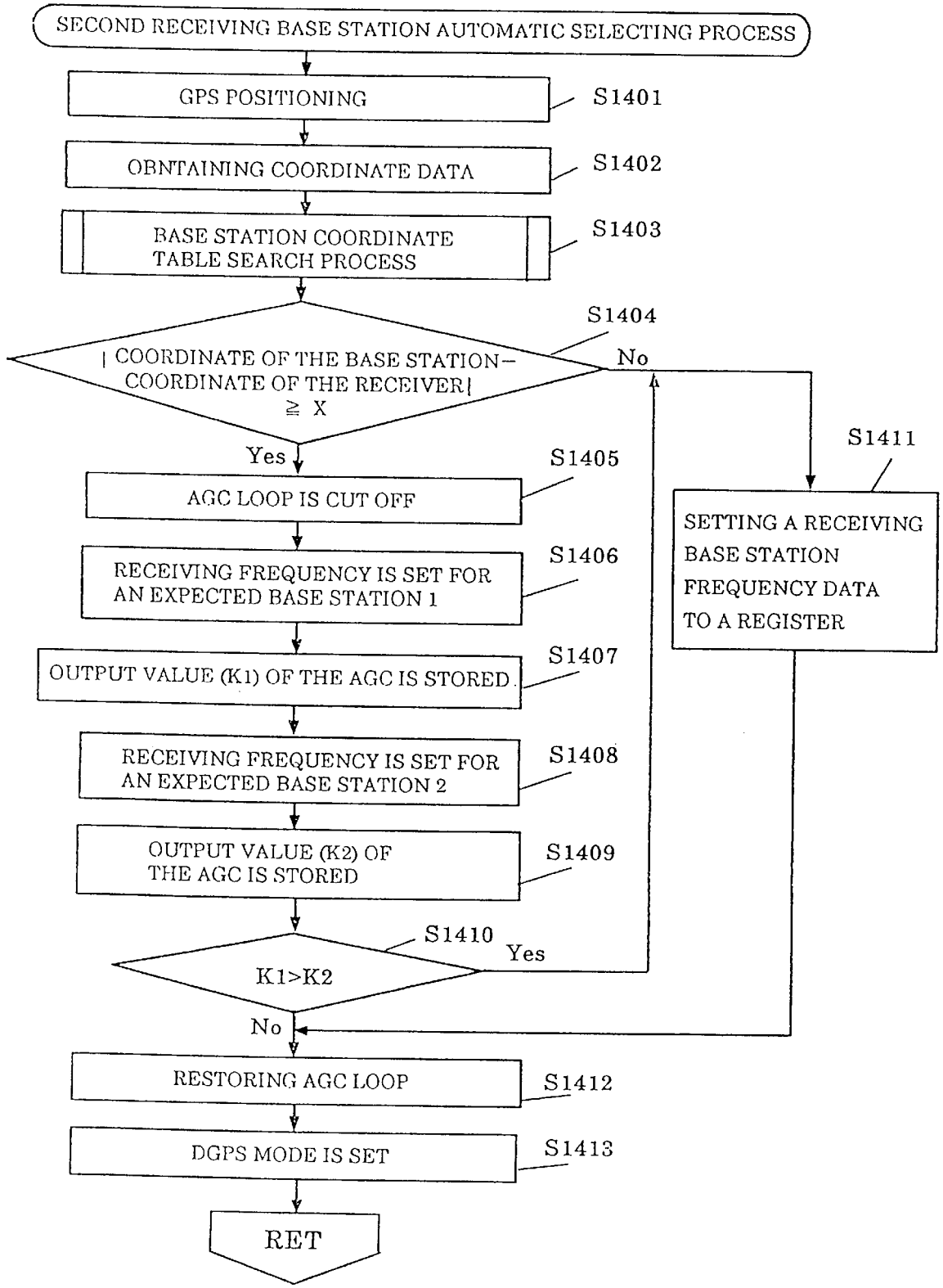
FIG. 14 is a flowchart for explaining a second operational example of a receiving base station auto-selecting process according to Embodiment 3 of this invention.

FIG. 14 is a flowchart showing a second operational example of a receiving base station automatic selecting process. First, GPS positioning is carried out by the GPS receiver 102 (S1401)to obtain coordinate data (S1402). Subsequently, since a coordinate of FM broadcast stations and a frequency data table are written in the ROM 105, a base station coordinate table search process is carried out to select an FM broadcast station nearest to the coordinate data received (S1403). Further, it is determined whether a difference (absolute value) in coordinate between the base station and the receiver is greater than a predetermined value x or not (S1404).

If it is determined in the above step S1404 that the difference (absolute value) in coordinate between the base station and the receiver is greater than the predetermined value x, an AGC loop is cut off (S1405). Thereafter, a receiving frequency is set for an expected base station 1 among a plurality of base stations (S1406), and an output value (K1) of the AGC 1206 is stored (S1407). Incidentally, the value K increases with increase in signal demodulated by the wave-form detector 1205. Then the receiving frequency is set for an expected base station 2 (S1408), and an output value (K2) of the AGC 1206 is stored (S1409). K1 and K2 stored are compared to determine whether K1>K2 is satisfied or not (S1410).

On the other hand, if it is determined at the above step S1404 that the difference (absolute value) in coordinate between the base station and the receivers smaller than the predetermined value x, the CPU 103 set receiving frequency data to the register for controlling the receiving frequency for the selective frequency amplifier 1201 (S1411) to restore the AGC loop being cut off (S1412), and a DGPS operation mode is set (S1413). That is, in the DGPS mode, the operations as stated in Example 1 and 2 are carried out to calculate a moving distance and speed of the human body. Then this operation is returned.

If K1>K2 is not satisfied in the above step S1410, the process returns to the step S1411, whereas, if K1>K2 is determined, the process proceeds to the step S1412 to carry out a similar process. Then this operation is returned.

Incidentally, in the above embodiments, the FM broadcast station was considered as an example of a receiving base station. However, there is no limitation to the above, and other base stations may be considered provided they are a known station. For example, it is possible to utilize a combination of an FM broadcast station and other media, VICS information being placed in service for car navigation, INMALSAT information, etc.

Although in the above embodiments explanations were made for the tuning function executed based on a program for the CPU 103, a circuit for performing the tuning operation may be provided as a hardware to carry out a similar operation.

As explained above, a portable GPS receiver according to this invention (claim 1), a traveling stride is determined from a moving distance of two points at which the GPS receiver effects positioning and a number of traveling pitches during between the positionings. A moving distance and a moving speed are determined from the stride. This makes it possible to continuous measurement even where positioning is difficult to effect such as in a tunnel or a valley between buildings. Also, the moving distance and the moving speed are determined with the stride as a reference, eliminating a necessity of continuously effecting positioning of the GPS receiving means.

Also, in a portable GPS receiver according to this invention (claim 2), the time period of continuous positioning of the GPS receiving means is minimized by performing continuous positioning only during of from starting measurement of a traveling speed and a traveling distance to determining a traveling stride.

Also, in a portable GPS receiver according to this invention (claim 3), after the GPS positioning, it is evaluated whether the difference in advancing the direction between the preceding time and the present time is within a given amount or not. As a result, if there is a change in moving direction, the positioning of the GPS receiver is continuously made during a movement over the given distance. This can eliminate a large error occurring between a straight-lined moving distance obtained by coordinates by the GPS receiver and an actual distance, where a large difference exists in moving direction between two positioning points.

Also, in a portable GPS receiver according to this invention (claim 4), a means for detecting a moving direction of a human body. The positioning of the GPS receiver is controlled base on a detected signal of that means. This enables recognition of two coordinates varying in moving direction without relying on a timer.

Also, in a portable GPS receiver according to this invention (claim 5), the GPS signal reception is effected at a start of measurement. A receiving base station for the DGPS data link receiver is selected from positioning data obtained. Thereafter, DGPS operation is carried out with accuracy.

Also, in a portable GPS receiver according to this invention (claim 6), auto-tuning is made to a receiving base station for the DGPS data link receiver that is best in signal receiving sensitivity. Thereafter, DGPS operation is carried out with accuracy.

Also, in a portable GPS receiver according to this invention (claim 7), positioning is continuously performed only during the time period of from starting measurement of a traveling speed and a traveling distance to determining a traveling stride. This minimizes the continuous positioning time period of the DGPS receiving means to a minimum.

Also, in a portable GPS receiver according to this invention (claim 8), after the GPS positioning, it is evaluated whether the difference in advancing direction between the preceding time and the present time is within a given amount or not. As a result, if there is a change in moving direction, the positioning of the GPS receiver is continuously made during a movement over a given distance. This can eliminate a large error occurring between a straight-lined moving distance obtained by coordinates by the GPS receiver and an actual distance, where a large difference exists in moving direction between two positioning points.

Also, in a portable GPS receiver according to this invention (claim 9), a means for detecting a moving direction of a human body. The positioning of the GPS receiver is controlled based on a detected signal of that means. This enables recognition of two coordinates varying in moving direction without relying on a timer. Since a next operating process is performed based on this recognition, it is possible to determine a stride with accuracy.

What is claimed is:

1. A portable GPS positioning apparatus for receiving a signal from a GPS satellite and measuring at least one of a position and a speed of the portable GPS positioning apparatus, the portable GPS positioning apparatus comprising:

GPS receiving means for receiving a signal from a GPS satellite;

movement pitch detecting means for detecting the pitch of a repetitive movement of a portion of a human body corresponding to ambulatory motion of the human body;

timer means for determining an operating period at which to intermittently receive a signal from a GPS satellite to obtain positioning data used for determining the position of the GPS positioning apparatus;

stride calculating means for calculating, at a respective operating period, a stride of the human body during said ambulatory motion in accordance with positioning data corresponding to two positions and a movement pitch detected by the movement pitch detecting means during receipt of the positioning data; and speed/distance calculating means for calculating, at a respective operating period, a speed and a distance of the ambulatory motion based on the stride determined by the stride calculating means and the pitch detected by the movement pitch detecting means.

2. A portable GPS positioning apparatus according to claim 1; further comprising means for controlling the GPS receiving means to continuously receive a GPS signal from a start of a measurement of the speed and the distance of the ambulatory motion of the human body to the determination of the stride of the human body by the stride calculating means.

3. A portable GPS positioning apparatus according to claim 1; further comprising means for determining, after effecting GPS positioning, whether a difference in an advancing direction of the human body during the ambulatory motion between successive measurements is within a predetermined distance, and for controlling the GPS receiver to continuously receive positioning data during a time period when the human body has advanced by more than the predetermined distance and a change in moving direction of the human body has been detected.

4. A portable GPS positioning apparatus according to claim 1; further comprising moving direction detecting means for detecting a moving direction of the human body, and means for controlling the GPS receiving means based on an output signal of the moving direction detecting means.

5. A portable GPS positioning apparatus according to claim 1; wherein the GPS signal includes a correction signal for each GPS satellite transmitted by a receiving reference station; and further comprising DGPS receiving means for correcting a GPS signal received from each GPS satellite, and means for selecting the receiving reference base station from GPS positioning data.

6. A portable GPS positioning apparatus according to claim 5; wherein the means for selecting includes means for selecting a receiving base station that has the best signal receiving sensitivity among a plurality of receiving base station to effect DGPS positioning.

7. A portable GPS positioning apparatus according to claim 5 or 6; further comprising means for controlling the DGPS receiving means to continuously receive a DGPS signal from a start of a measurement of speed and distance of the ambulatory motion of the human body to the determination of the stride of the human body by the stride calculating means.

8. A portable GPS receiver according to claim 5 or 6; further comprising means for determining, after effecting GPS positioning, whether a difference in an advancing direction of the human body during the ambulatory motion between successive measurements is within a predetermined distance, and for controlling the DGPS receiving means to continuously receive positioning data during a time period when the human body has advanced by more than the predetermined distance and a change in moving direction of the human body has been detected.

9. A portable GPS positioning apparatus according to claim 5 or 6; further comprising moving direction detecting means for detecting a moving direction of the human body, and means for controlling the GPS receiving means based on an output signal of the moving direction detecting means.

* * * * *